United States Patent [19]
Ryan et al.

[11] 3,827,661
[45] Aug. 6, 1974

[54] AIRCRAFT WING STRUCTURE AND METHOD OF ASSEMBLY

[75] Inventors: T. Claude Ryan, San Diego; Peter F. Girard, La Mesa, both of Calif.

[73] Assignee: Ryson Aviation Corporation, San Diego, Calif.

[22] Filed: July 26, 1972

[21] Appl. No.: 275,250

[52] U.S. Cl. .................... 244/123, 29/469, 29/448
[51] Int. Cl. .......................... B64c 1/00, B64c 3/00
[58] Field of Search ...... 244/123, 124, 133; 29/448, 29/449, 469; 416/233

[56] References Cited
UNITED STATES PATENTS

| | | | |
|---|---|---|---|
| 1,808,842 | 6/1931 | Fedor | 244/123 |
| 2,389,917 | 11/1945 | Leisen | 244/123 |
| 3,002,567 | 10/1961 | Stulen | 244/123 |

Primary Examiner—Trygve M. Blix
Assistant Examiner—Sherman D. Basinger
Attorney, Agent, or Firm—Brown & Martin

[57] ABSTRACT

An aircraft wing comprising an upper shell and a lower shell secured together to form a complete wing. The wing is of metal construction particularly adapted for assembly on an automobile rivetting machine, the use of two pre-assembled shells providing the necessary access to both sides for the rivetting machine to operate. The upper shell includes the top skin, ribs, spars and leading edge assembled in accurate airfoil configuration, the lower shell comprising the lower skin with attached stiffeners conforming to the lower contour of the airfoil section. Assembly of the shells is made primarily by blind rivets with conventional solid rivets where accessible.

2 Claims, 6 Drawing Figures

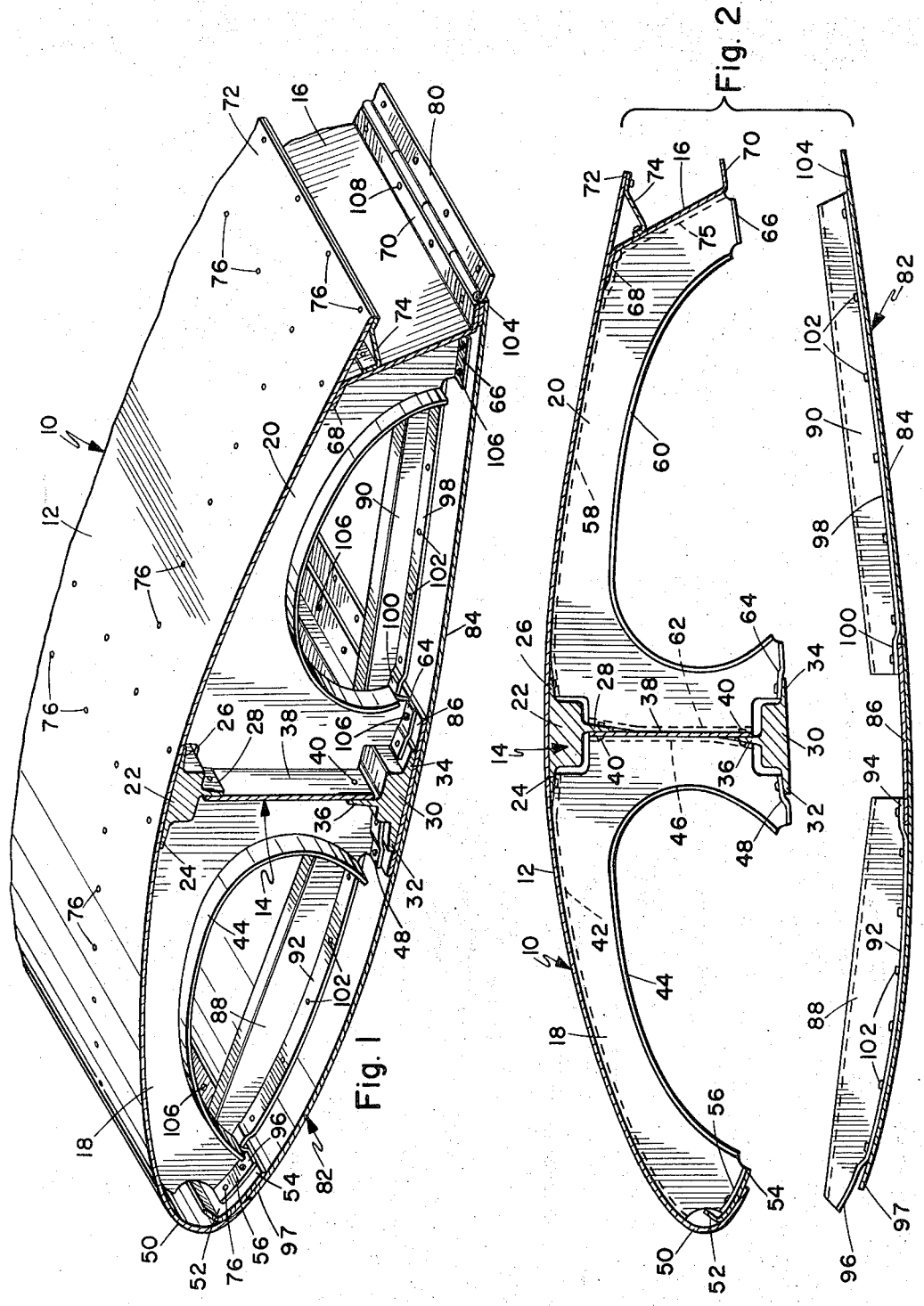

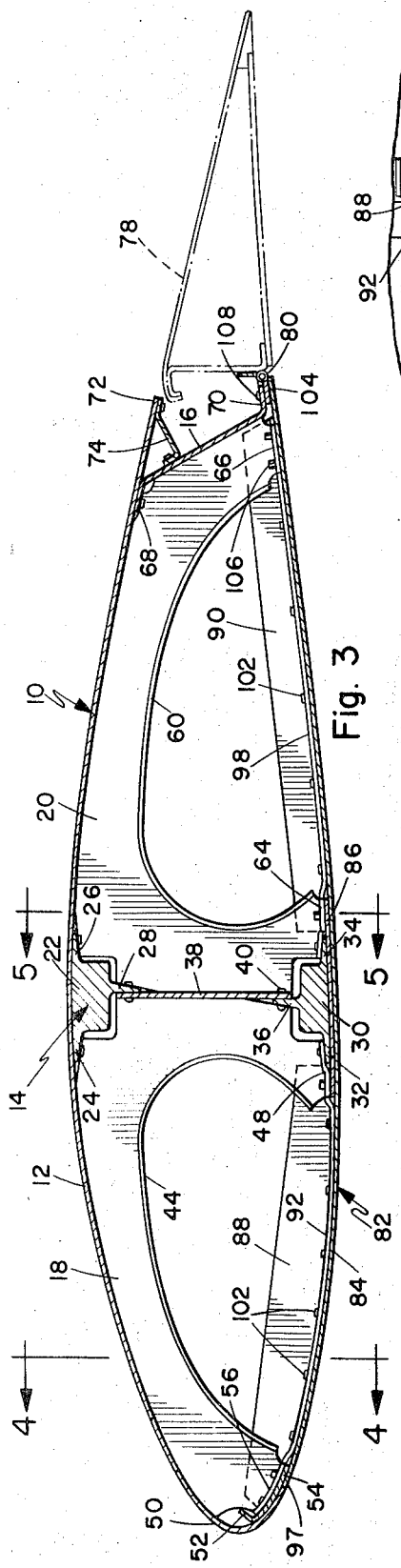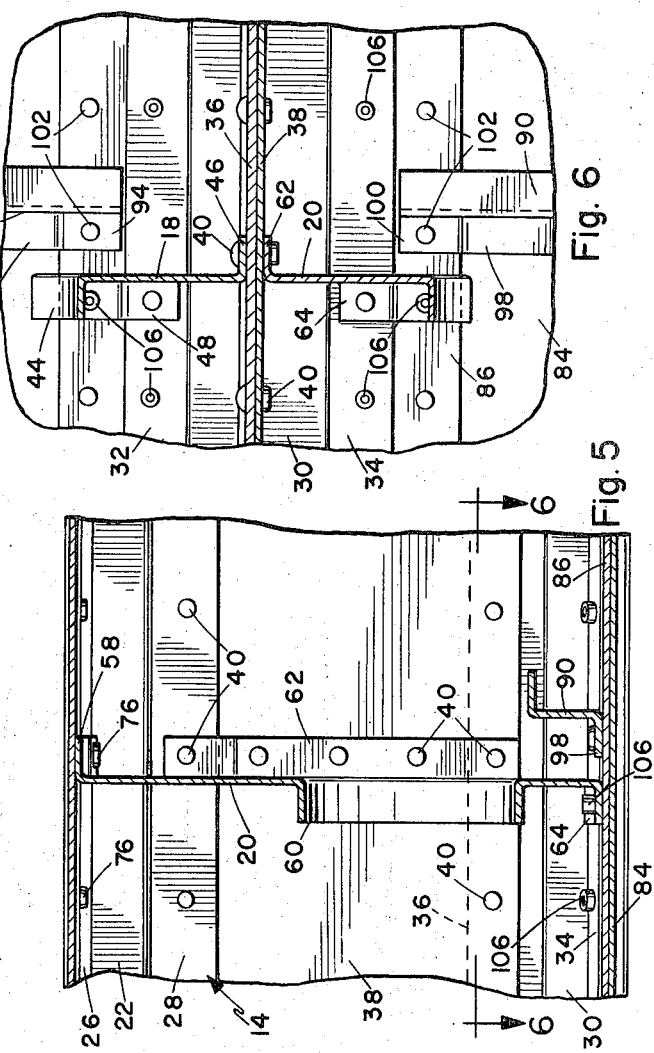

AIRCRAFT WING STRUCTURE AND METHOD OF ASSEMBLY

BACKGROUND OF THE INVENTION

In the construction of a rivetted metal wing for an aircraft, it is normal to use as many solid or upset type rivets as possible, for strength and low cost. To upset conventional solid rivets, access is necessary to both sides, but in small wings, this is not very practical. Where access is not available, various types of blind rivets are used, which are considerably more expensive than simple rivets. A great deal of hand work is thus required in assembling such a wing.

Automatic rivetting machines are available which can drill a hole, insert a rivet and upset the rivet in sequence in a few seconds. A typical machine has a pair of arms forming a deep throat for structure clearance, one arm carrying a fixed anvil and the other having a movable anvil for clamping the parts and upsetting the rivets. The drilling and rivet inserting tools are usually mounted on the fixed anvil portion. Such a machine requires clear access to both sides of a structure and its use is limited in the final stages of assembly. To reduce labor and material costs it is desirable to use an automatic rivetting machine as much as possible.

SUMMARY OF THE INVENTION

The wing described herein is constructed in two shell portions which provide full access for an automatic rivetting machine for almost all of the basic assembly. Blind rivetting is used only for joining the two shells and is thus reduced to a minimum.

The shell portions include an upper shell, which is the major portion and forms the airfoil, and a lower shell which is essentially a reinforced lower skin. In the upper shell the top skin is extended around the leading edge and is attached to ribs which conform to the upper airfoil profile. The main spar and rear spar are also attached to the top skin and ribs, with all reinforcing and internal structure included. Controls and other fittings can also be installed in the upper shell before final assembly. For the bottom shell, stiffeners conforming to the lower airfoil profile are rivetted to the lower skin and reinforcing is attached where required.

The lower shell is attached to the upper shell by spanwise rows of blind rivets at the leading edge and the spars, to complete the wing. In some instances the rivets at the rear spar will be accessible for automatic installation. The basic structure can terminate at the rear spar where control surfaces are to be attached, or can be extended to the full trailing edge. Structural details can vary considerably to suit specific size and load requirements.

The primary object of this invention, therefore, is to provide a new and improved aircraft wing structure.

Another object of this invention is to provide a new and improved aircraft wing constructed in two basic shell proportions, to provide access for use of an automatic rivetting machine.

A further object of this invention is to provide a new and improved aircraft wing in which the two shell portions are finally assembled by a minimum number of blind rivets.

Other objects and many advantages of this invention will become more apparent upon a reading of the following detailed description together with an examination of the drawings, wherein like reference numerals refer to like parts throughout and in which:

FIG. 1 is a perspective view of a section of a completed wing.

FIG. 2 is a chordwise sectional view of the upper and lower shell structures separated.

FIG. 3 is a chordwise section of the shell structures joined.

FIG. 4 is an enlarged sectional view taken on line 4—4 of FIG. 3.

FIG. 5 is an enlarged sectional view taken on line 5—5 of FIG. 4.

FIG. 6 is a sectional view taken on line 6—6 of FIG. 5.

DESCRIPTION OF THE PREFERRED EMBODIMENT

The wing structure illustrated is typical and can vary in rib configuration, spar structure and positions and other details, depending on the size and load requirements of the wing. Simple jigs or assembly fixtures may be used if needed, the techniques being well known.

The upper shell 10 comprises the top skin 12, main spar 14, rear spar 16, nose ribs 18 and rear ribs 20. Main spar 14 has a spanwise upper cap member 22, with front and rear top flanges 24 and 26 and a downwardly extending web flange 28. A similar lower cap member 30, with front and rear bottom flanges 32 and 34, and an upwardly extending web flange 36, is joined to the upper cap member by a vertical web 38 rivetted to the web flanges by rivets 40. Nose rib 18 has a top flange 42 conforming to the upper contour of the airfoil section, the lower portion of the rib having a large flanged cut out 44. At the rear of nose rib 18 is a vertically extending flange 46 secured to web 38 and web flanges 28 and 36 by rivets 40. The lower rear corner of the nose rib has a short flange 48 which is rivetted to front flange 32. Top skin 12 is rolled to form the leading edge 50 and is reinforced by a doubler 52 having a rearwardly extended attachment flange portion 54 on the underside of the leading edge. The forward end of nose rib 18 has a short flange 56 which is rivetted to the doubler 52 and leading edge skin.

Rear rib 20 has a top flange 58 conforming to the upper contour of the airfoil section, and a large flanged cut out 60. At the forward end of the rear rib is a vertical flange 62 which is secured to the main spar web and web flanges by the same rivets holding flange 46, as in FIG. 6. The forward lower corner of rear rib 20 has a short bottom flange 64 rivetted to main spar flange 34, and the lower rear corner has a short bottom flange 66 for subsequent attachment to the lower shell. The rear edge of rib 20 has a flange 75 for attachment to the rear spar 16, which is substantially Z-shaped, with a forwardly extending top flange 68 and a rearwardly extending bottom attachment flange 70. Top skin 12 projects beyond the rear spar to form a shroud 72, which is supported by a spanwise stiffener 74 from the rear spar. The top skin is secured to the rib flanges 42, 56 and 58, main spar flanges 24 and 26, rear spar flange 68 and stiffener 74 by rivets 76. The rolled under leading edge portion of the top skin is also secured to doubler 52 and nose rib flanges 56 by rivets 76. With the bottom of the shell structure open, all or most of the rivets are accessible to an automatic rivetting machine, or for hand rivetting with solid rivets.

In the configuration illustrated, with the structure terminating at the rear spar, a control surface 78, such as a flap or aileron, may be attached by a hinge 80 to the lower rear spar flange 70. Any other hinge arrangement and appropriate shroud configuration may be used. For a complete airfoil section the top skin would be extended to form a suitable trailing edge structure with additional rib members as necessary.

The lower shell 82 comprises the bottom skin 84, with a spanwise doubler plate 86 at the main spar position and supported by chordwise stiffener ribs 88 and 90. Nose stiffener rib 88 has a bottom flange 92 conforming to the lower contour of the airfoil section, the rear end of the flange having a joggled portion 94 to fit over doubler plate 86. The forward end of flange 92 has a joggled portion 96 to fit over doubler 52, with the front attachment edge 97 of bottom skin 84 passing under the doubler and abutting the rearwardly turned lower edge of top skin 12. Rear stiffener rib 90 has a bottom flange 98 conforming to the airfoil section, the forward end of the flange having a joggled portion 100 to fit over doubler plate 86. The bottom skin 84 is secured to stiffener ribs 88 and 90 and to doubler plate 86 by solid rivets 102, to form a complete lower airfoil surface.

While the upper shell 10 is open, controls and other fittings are installed as required. To complete the wing, the lower shell is installed by inserting the joggled portions 96 of the nose reinforcing ribs over the doubler flange 54 and pushing the lower shell forward to seat into the leading edge. The doubler plate 86 is then attached to the lower spar cap member 30 and the rear edge portion 104 of bottom skin 84 attached to rear spar bottom flange 70. Standard quick release fasteners may be used to hold the assembly in alignment.

The assembly is secured by means of blind rivets 106 in spanwise rows at the leading edge and main spar, and by solid rivets 108 at the rear spar flange 70 where there is access. At the leading edge the rivets 106 pass through the front edge portion 97 of the lower skin and doubler flange 54, and through nose rib flanges 56 with additional rivets through the skin and doubler and the joggled portions 96 of the stiffener ribs. At the main spar the blind rivets pass through the lower skin 84 and doubler plate 86 and through cap member flanges 32 and 34. Additional rivets are inserted through the skin and doubler and the flanges 48 and 64 of the ribs. The flange 66 of each rear rib 20 is also secured to lower skin 84 by blind rivets 106.

The access provided by the two shell construction permits high quality rivetting at minimum cost, the resultant wing being accurately formed without elaborate jigs. All of the external blind rivets are in the lower surface and can be inserted without having to move the wing in a partly assembled condition.

Having described our invention, we now claim:

1. The method of assembling an aircraft wing, comprising:

constructing an upper shell forming the major portion of the wing by assembling spanwise complete main spar and rear spar structures extending substantially the full depth of the airfoil, and securing to the spars a plurality of chordwise ribs having upper edges conforming to the upper airfoil contour;

securing to the ribs and spar structures a top skin forming the upper wing surface, the underside of the upper shell being open for interior access;

constructing a sparless lower shell forming a reinforced skin, by securing to a bottom skin a plurality of chordwise stiffening ribs having lower edges conforming to the lower airfoil contour;

and securing the complete lower shell to the complete upper shell entirely by externally applied fastening means.

2. The method of claim 1, and including the steps of rolling the upper skin downwardly and rearwardly to form the leading edge of the wing;

securing to the rearwardly rolled, portion of the upper skin a leading edge doubler extending rearwardly from the skin;

and joggling the lower shell stiffening ribs to fit over the doubler, with the lower skin extending below the doubler into abutment and flush with the upper skin.

* * * * *